(12) United States Patent
Van Stevendaal et al.

(10) Patent No.: US 7,724,935 B2
(45) Date of Patent: May 25, 2010

(54) CORRECTION OF ARTIFACTS CAUSED BY THE HEEL EFFECT

(75) Inventors: Udo Van Stevendaal, Ahrensburg (DE); Thomas Kohler, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1013 days.

(21) Appl. No.: 10/596,463

(22) PCT Filed: Dec. 6, 2004

(86) PCT No.: PCT/IB2004/052673

§ 371 (c)(1),
(2), (4) Date: Jun. 14, 2006

(87) PCT Pub. No.: WO2005/059592

PCT Pub. Date: Jun. 30, 2005

(65) Prior Publication Data

US 2008/0317320 A1    Dec. 25, 2008

(30) Foreign Application Priority Data

Dec. 16, 2003 (EP) ................................. 03104702

(51) Int. Cl.
*G06K 9/00* (2006.01)
(52) U.S. Cl. ...................... 382/132; 382/128; 382/110; 382/100
(58) Field of Classification Search .................. 382/110, 382/128; 128/100, 922; 250/455.11, 453.11
See application file for complete search history.

(56) References Cited

U.S. PATENT DOCUMENTS

| 3,965,358 | A | | 6/1976 | Macovski |
| 4,714,997 | A | | 12/1987 | Crawford et al. |
| 5,602,895 | A | * | 2/1997 | Fivez et al. ................. 378/98.4 |
| 5,943,387 | A | * | 8/1999 | Lynch et al. ................... 378/22 |
| 6,430,252 | B2 | * | 8/2002 | Reinwand et al. .............. 378/8 |
| 6,600,801 | B2 | * | 7/2003 | Raupach ........................ 378/4 |
| 2002/0018540 | A1 | | 2/2002 | Stierstorfer |
| 2003/0004405 | A1 | | 1/2003 | Townsend et al. |
| 2003/0031299 | A1 | | 2/2003 | Ohishi |

OTHER PUBLICATIONS

Van De Casteele, E., et al.; A bimodal energy model for correcting beam hardening artefacts in X-ray tomography; 2003; IEEE Proc. of the 29th Northeast Bioengineering Conf.; pp. 57-58.

* cited by examiner

*Primary Examiner*—Samir A Ahmed
*Assistant Examiner*—Ali Bayat

(57) ABSTRACT

A method for processing polychromatic attenuation values, wherein the polychromatic attenuation values are acquired by means of a polychromatic source of radiation generating a cone beam and radiation detector array with a plurality of detector rows, wherein the plurality of detector rows are arranged adjacent to each other in a first direction perpendicular to a second direction, wherein the second direction is parallel to the plurality of detector rows, the method comprising the step of: assigning the monochromatic attenuation values to polychromatic attenuation values, wherein the polychromatic attenuation values depend on the first direction and a three-dimensional look-up table is used for assigning the monochromatic attenuation values to the polychromatic attenuation values.

20 Claims, 5 Drawing Sheets

CORRECTION OF ARTIFACTS CAUSED BY THE HEEL EFFECT

The present invention relates to the field of image processing, for example, in medical applications. In particular, the present invention relates to a method of processing polychromatic attenuation values, to a method of generating a look-up table for correcting beam-hardening effects in polychromatic attenuation values, to data processing devices and to respective computer programs.

In a CT scanner with a polychromatic source of radiation, such as a polychromatic x-ray source, a polychromatic x-ray cone beam is projected onto a two-dimensional detector array. When passing through an object of interest, the beam gradually becomes harder, i.e. its mean energy increases. This may cause beam-hardening artifacts, such as cupping in the images generated from the attenuation values read out from the detector.

It is an object of the present invention to provide for an improved processing of polychromatic attenuation data.

In accordance with an exemplary embodiment of the present invention as set forth in claim 1, the above object may be solved by a method of processing polychromatic attenuation values, wherein the polychromatic data is corrected by assigning monochromatic values to the polychromatic attenuation values. According to this exemplary embodiment of the present invention, the monochromatic attenuation values are assigned to the polychromatic attenuation values, which are read out from the two-dimensional detector and depend on the column direction of the two-dimensional detector, i.e. on the direction perpendicular to the direction of the lines of the detector array.

The polychromatic x-ray spectrum depends on the cone angle, such that there is a varying intensity distribution for each detector row. The monochromatic radiation is independent from the cone angle and thus, without an examination object, there is the same intensity for each detector row or element.

Advantageously, this may allow for a very effective soft-tissue correction, i.e. correction of (image) artifacts caused by the beam hardening effect and/or the heel effect.

According to another exemplary embodiment of the present invention as set forth in claim 2, a three-dimensional look-up table is used for assigning the monochromatic attenuation values to the polychromatic attenuation values, which may allow for a very simple assignment of the respective monochromatic attenuation values to the respective polychromatic attenuation values. Furthermore, this may allow for a fast and simple processing.

According to another exemplary embodiment of the present invention as set forth in claim 3, the look-up table is generated on the basis of projection data of a calibration object subjected to polychromatic x-ray beams and projection data of the same calibration object considering monochromatic x-ray beams.

Advantageously, such a three-dimensional look-up table, taking into account the cone angle of the cone beam or the coordinates of the rows of the detector array may allow for an improved image quality without artifacts caused by beam hardening or the heel effect.

According to another exemplary embodiment of the present invention as set forth in claim 4, a method of generating a look-up table for correcting beam-hardening effects in polychromatic attenuation values is provided, which allows for a simple generation of a three-dimensional look-up table and the application of which may allow for a better image quality, by taking into account, for example, the heel effect in cone beam CT scanners.

Another exemplary embodiment of the method of generating a look-up table according to the present invention is provided in claim 5.

Claims 6 to 9 relate to exemplary embodiments of data processing devices which may allow for improved image quality of images generated from polychromatic attenuation values read from a two-dimensional detector array by taking into account, for example, the heel effect in cone-beam CT scanners.

The present invention relates also to computer programs which may, for example, be executed on a processor, such as an image processor. Such computer programs may be part of, for example, a CT scanner system. The computer programs according to exemplary embodiments of the present invention are set forth in claims 10 and 11. These computer programs may preferably be loaded into working memories of data processors. The data processors are thus equipped to carry out exemplary embodiments of the methods of the present invention. The computer programs may be stored on a computer readable medium, such as a CD-ROM. The computer programs may also be presented over a network such as the WorldWideWeb, and may be downloaded into the working memory of a data processor from such networks.

It may be seen as the gist of an exemplary embodiment of the present invention that a 3D look-up table is generated, taking into account that the x-ray spectrum varies with the cone angle, because of the heel effect. This look-up table may consist of a three-dimensional data set, including monochromatic attenuation values for all corresponding polychromatic attenuation values for each x-ray spectrum, depending on the cone angle, i.e. the column direction of the two-dimensional detector array. This may provide for a better image quality by taking into account the heel effect in cone beam CT scanners.

These and other aspects of the present invention will become apparent from and elucidated with reference to the embodiments described hereinafter.

Exemplary embodiments of the present invention will be described in the following, with reference to the following drawings.

Figure 1:
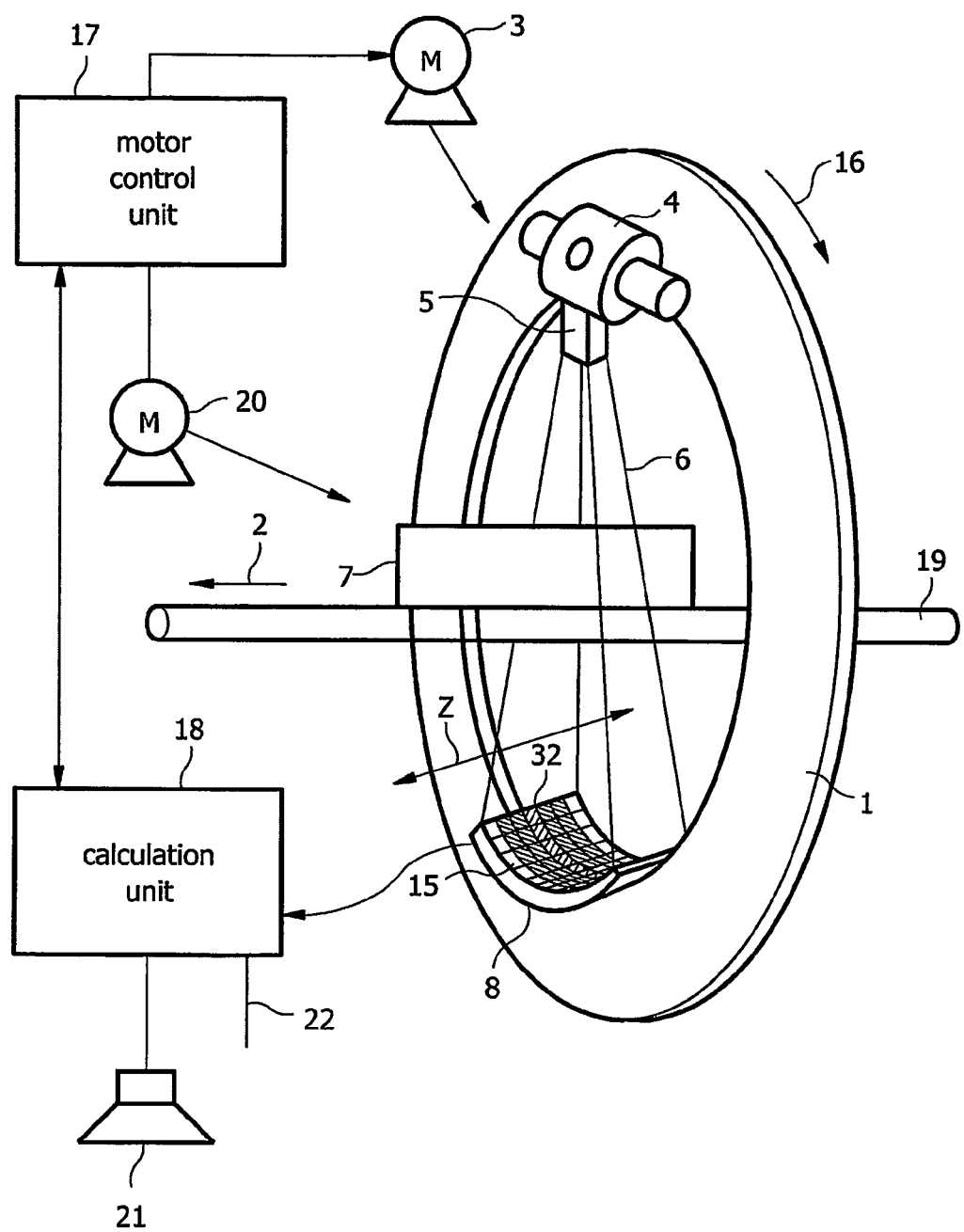
FIG. 1 shows a simplified schematic representation of an exemplary embodiment of a computed tomography (CT) scanner system according to the present invention.

FIG. 1 shows an exemplary embodiment of a CT (computed tomography) scanner according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications such as material testing.

The scanner depicted in FIG. 1 is a cone beam CT scanner. The CT scanner depicted in FIG. 1 comprises a gantry 1, which is rotatable around a rotational axis 2. The gantry is driven by means of a motor 3. Reference numeral 4 designates a source of radiation such as an x-ray source, which, according to an aspect of the present invention, emits a polychromatic radiation.

Reference character 5 designates an aperture system, which forms the radiation beam emitted from the radiation source to a cone shaped radiation beam 6.

The cone beam 6 is directed such that it penetrates an object of interest 7, arranged in the center of the gantry 1, i.e. in an examination region of the CT scanner and impinges onto the detector 8. As may be taken from FIG. 1, the detector 8 is arranged on the gantry 1 opposite to the source of radiation 4, such that the surface of the detector 8 is covered by the cone beam 6. The detector 8 depicted in FIG. 1 has seven detector lines 15, each comprising a plurality of detector elements.

As can be taken from FIG. 1, the detector lines or rows 15 are arranged parallel to each other stacked along a direction parallel to a rotation axis 2 of the gantry 1. The plurality of detector lines 15 is arranged adjacent to each other in a direction parallel to the axis 2, namely along a direction indicated in FIG. 1 by arrow z. In other words, the columns of the detector 8 are parallel to the z direction, whereas the detector lines 15 (or detector rows 15) extend perpendicular to the z direction.

It may also be stated, that, as may be taken from FIG. 1, the detector cells of the detector 8 are arranged in lines and columns, wherein the columns are parallel to the rotational axis 2, whereas the lines (detector lines or rows 15) are arranged in planes perpendicular to the rotational axis 2.

As indicated above, the aperture system 5 is preferably adjusted, such that the whole detector, i.e. all lines and columns of the detector 8 are covered by the cone beam 6. The z-position (a location parallel to the rotation axis 2) of a respective detector line 15 of the detector 8 may also be indicated by means of the cone beam angle, i.e. an angle between a first line from a center line 32 of the detector, i.e. here, the fourth row of the detector 8 and the source of radiation 4 and a second line from the respective other one of the detector lines or rows 15 and the source of radiation 4.

During a scan of the object of interest 7, the source of radiation 4, the aperture system 5 and the detector 8 are rotated along the gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

In FIG. 1, the object of interest is disposed on a conveyor belt 19. During the scan of the object of interest 7, while the gantry 1 rotates around the item of baggage 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans to thereby measure single slices. Instead of providing a conveyor belt 19, for example, in medical applications where the object of interest 7 is a patient, a movable table is used. However, it should be noted that in all of the described cases, it is also possible to perform a circular scan, where there is no displacement in a direction parallel to the rotational axis 2, but only the rotation of the gantry around the rotational axis 2.

The detector 8 is connected to the calculation unit 18. The calculation unit 18 receives the detection result, i.e. the read-outs from the detector elements of the detector 8 and determines a scanning result on the basis of these read-outs. The detector elements of the detector 8 may be adapted to measure the attenuation caused to the cone beam 6 by the object of interest 7. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit, which may be realized by a data processor, may also be adapted to perform a processing of polychromatic attenuation values based on the read-outs from the detector elements of the detector 8 by correcting artifacts caused by the heel effect and/or beam-hardening effects in the polychromatic values by assigning monochromatic attenuation values to the polychromatic attenuation values. According to an aspect of the present invention, the polychromatic attenuation values depend on the z-direction or on the cone angle.

Furthermore, the calculation unit 18 may be adapted to generate a look-up table for correcting artifacts caused by the heel effect and/or by a beam-hardening in polychromatic attenuation values (read-outs from the detector 8) by firstly determining mean energies of a spectrum of the source of radiation, determining first projection data by taking into account the polychromatic source of radiation 4, the detector array 8 and a calibration object, determining second projection data by taking into account a monochromatic source of radiation, the detector rate 8 and the calibration object (this step may be performed by a simulation), and generating a three-dimensional look-up table on the basis of the first and second projection data. The three-dimensional look-up table comprises monochromatic attenuation values for all corresponding polychromatic attenuation values for each detector row 15 of the detector 8.

Furthermore, as may be taken from FIG. 1, for example, the calculation unit 18 may be connected to a loudspeaker 21, for example, to automatically output an alarm.

In the following, the theoretical background of the beam-hardening and the heel effect will be described in further detail. When a polychromatic x-ray beam, such as the cone beam 6 passes through matter, low-energy photons are absorbed, as the linear attenuation coefficient decreases with energy. As a result, the beam gradually becomes harder, i.e. its mean energy increases. The harder the beam the lower the attenuation. Therefore, the total attenuation is no longer a linear function of the thickness of the absorber.

Neglecting this hardening effect in the reconstruction process may lead to image artifacts. A known beam-hardening artifact is, for example, cupping. X-ray beams which go through central pixels always have a relatively long path length, while beams which go through eccentric pixels may have short and long path lengths. As a result, pixel values will always be depressed towards the center of an object.

Figure 2:
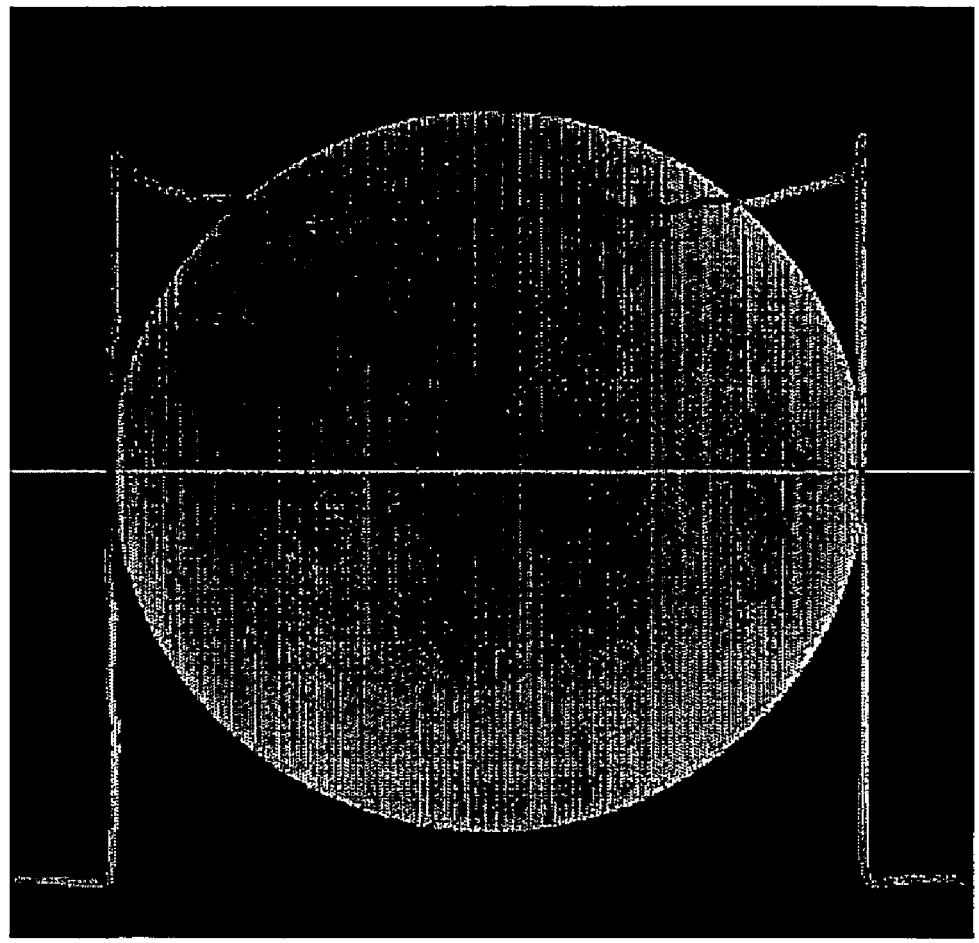
FIG. 2 shows a reconstructed image slice, including image artifacts, which may be caused by the beam-hardening effect/heel effect.

FIG. 2 shows a reconstructed image of a water cylinder of 400 mm in diameter. Level and window are zero and 500 HU (Hounsfield Units), respectively. The Hounsfield values measured by a straight horizontal line through the center of the object, are plotted in arbitrary units. As may be seen from FIG. 2, without any correction of the hardening, i.e. without any soft tissue correction, a strong cupping can be observed.

A prerequisite for performing a soft tissue correction is the generation of a 2D look-up table, which includes monochromatic attenuation values for all corresponding polychromatic attenuation values. This may be done, for instance, either by simulating or by measuring the projection data of a slice of a water cylinder with polychromatic x-ray beams. If the x-ray spectrum for a certain tube voltage is known, the mean energy of the spectrum can be calculated. Then, another scan of the same slice of the water cylinder is simulated with monochromatic x-ray beams having an energy which is equal to the mean energy of the x-ray spectrum.

From both projection data sets, i.e. from the projection data set with polychromatic x-ray beams and the data set with monochromatic x-ray beams, a correlation between the monochromatic and the polychromatic attenuation values can be calculated, which may be used for correcting artifacts caused by beam hardening and/or the heel effect.

However, in cone beam CT scanners, the x-ray spectrum varies with the cone angle, because of the heel effect. The heel effect will be further described with reference to FIG. 3.

Figure 3:
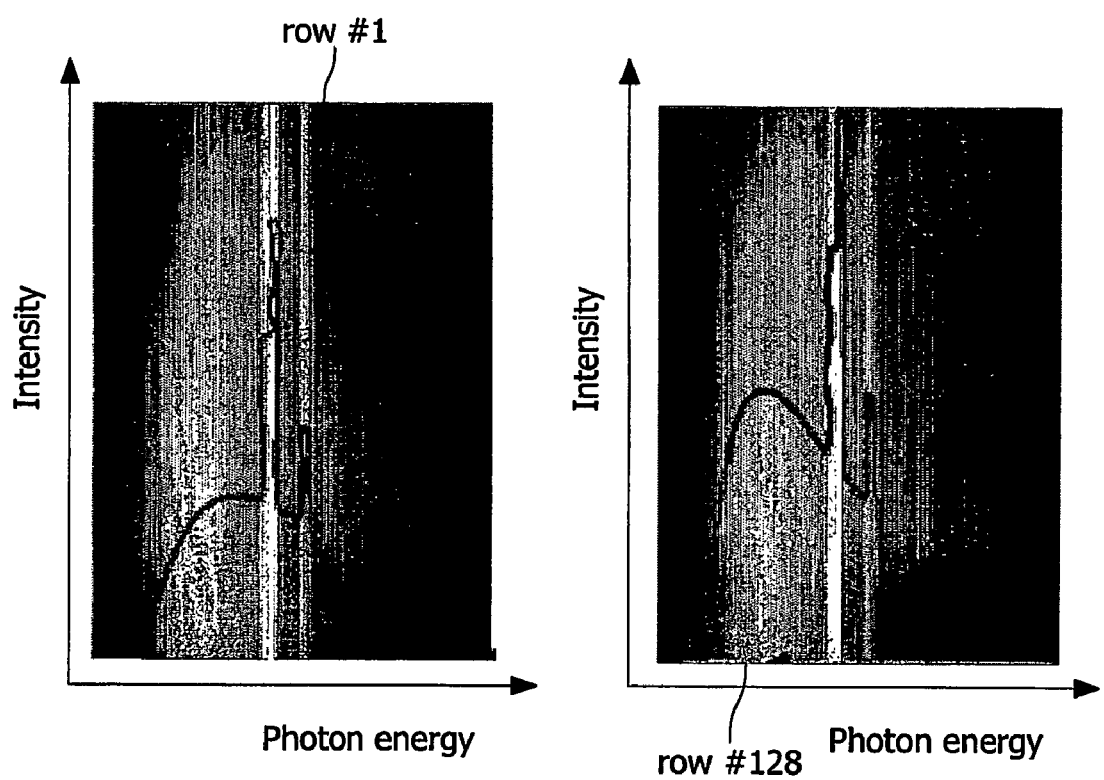
FIG. 3 shows two drawings to further explain the impact of the heel effect.

FIG. 3 shows two drawings for further explaining the impact of the heel effect. The lines plotted in the two drawings are x-ray spectra, measured in row 1 (left) of a detector array and in row 128 (right) of the detector array, which is a two-dimensional detector array. As may be taken from a comparison of the left drawing to the right drawing of FIG. 3, the intensity values and the peak values in particular, are significantly lower in row 1 (left drawing) in comparison to row 128 (right drawing). Thus, besides the beam-hardening effect, the dependence of the x-ray spectrum on the cone angle may cause image artifacts.

This may in particular be of a disadvantage in conjunction with two-dimensional detectors with more and more rows, therefore requiring sources with a greater cone angle.

According to an exemplary embodiment of the present invention, a three-dimensional look-up table is generated, taking into account that the x-ray spectrum varies with the cone angle, because of the heel effect. The look-up table may consist of a 3D data set, including monochromatic attenuation values for all corresponding polychromatic attenuation values for each x-ray spectrum, depending on the cone angle.

In the following, with reference to FIG. 4, an exemplary embodiment of a method to generate a 3D look-up table which may be performed in the calculation unit 18 in the CT scanner system of FIG. 1 will be described. Then, with reference to FIG. 5, a soft tissue correction is described using the three-dimensional look-up table generated in accordance with the method described with reference to FIG. 4. The soft tissue correction described in FIG. 5 is the recalculation of measured projection data by using the three-dimensional look-up table.

Figure 4:
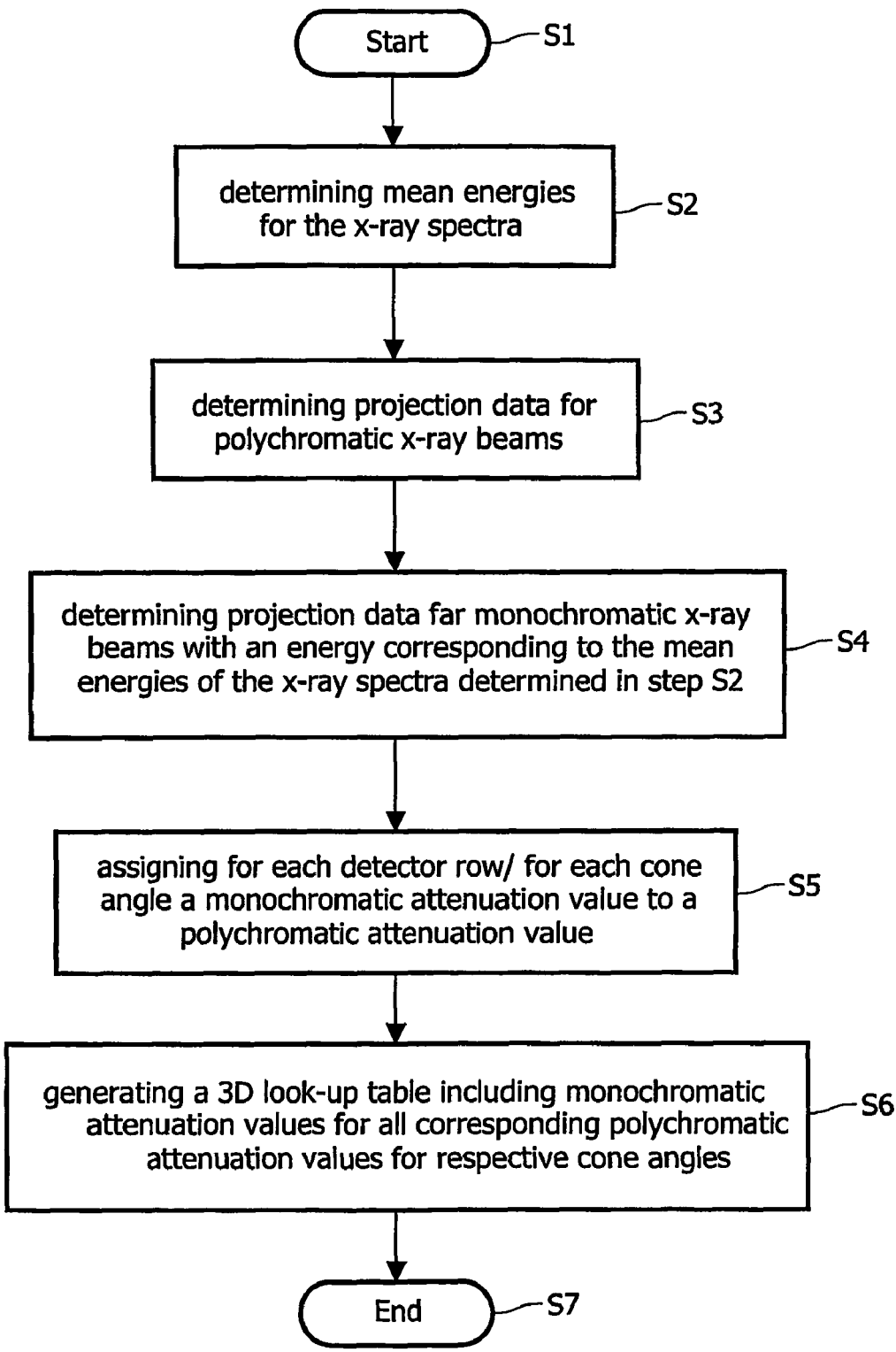
FIG. 4 shows a flowchart of an exemplary embodiment of a method of operating the CT scanner system or an image processor according to the present invention.
Figure 5:
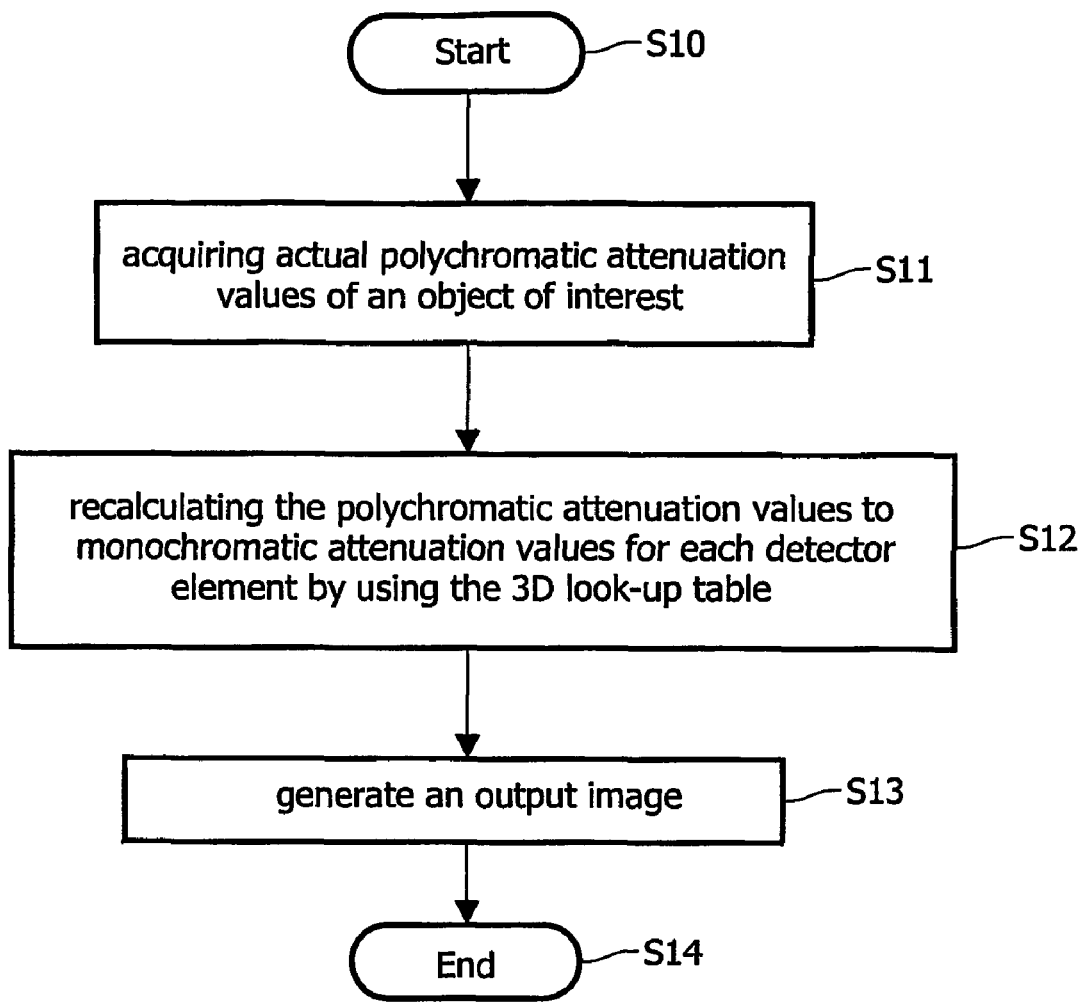
FIG. 5 shows a flowchart of another exemplary embodiment of a method of operating the CT scanner system or the data processing system according to the present invention.

FIG. 4 shows a flowchart of an exemplary embodiment of a method of generating a three-dimensional look-up table according to the present invention. Before the start in step S1, the spectrum of the x-ray source is determined for a given tube voltage in dependence of the cone angle. Then, after the start in step S1, mean energies for the x-ray spectra are calculated in step S2.

Then, in the subsequent step S3, by considering a two-dimensional detector and, for example, a water cylinder of 400 mm in diameter as a calibration object (other suitable objects may be selected), the first set of projection data is calculated via a circular source trajectory (circular acquisition). The source of radiation considered for this first set of projection data emits polychromatic x-ray beams and the spectrum depends on the cone angle, because of the heel effect.

Then, in the subsequent step S4, a second set of projection data is generated by performing a similar determination with monochromatic x-ray beams having an energy which is equal to the mean energy of the calculated x-ray spectrum. Both steps, i.e. steps S3 and S4 may either be performed by an actual measurement or may be performed by a simulation.

Then, in the subsequent step S5, for each detector row or line, and therefore for each cone angle, a monochromatic attenuation value is assigned to a respective polychromatic attenuation value relating to the same detector element or detector line. Here, an interpolation may be applied.

Then, in the subsequent step S6, the three-dimensional look-up table is generated, including monochromatic attenuation values for all corresponding polychromatic attenuation values for each cone angle.

Then, in the subsequent step S7, the method ends.

In a variant of this exemplary embodiment of the present invention, the three-dimensional look-up table may also comprise quotients of the respective polychromatic and monochromatic attenuation values for each detector element.

Once a three-dimensional look-up table is generated, it can be implemented in the soft tissue pre-processing step, as shown in FIG. 5. FIG. 5 shows an exemplary embodiment of a method of processing polychromatic attenuation values, such that image artifacts, caused, for example, by the heel effect, or by a beam-hardening, is compensated for in the output image.

After the start in step S10, the method continues to step S11, where actual polychromatic attenuation values are acquired for an object of interest. As indicated above, this may, for example, be performed by using a CT scanner system, such as the one depicted in FIG. 1. Then, the read-outs of the detector are forwarded to the calculation unit. Then, in the subsequent step S12, in the calculation unit 18, the polychromatic attenuation values are recalculated to the monochromatic attenuation values for each detector element by using the three-dimensional look-up table. This may also be performed, for example, by multiplying the actually measured polychromatic attenuation values, with the quotient from the polychromatic attenuation value and the monochromatic attenuation values of the respective detector element, which were determined from the calibration object. Then, in the subsequent step S13, an output image is generated. Then, the method ends in step S14.

As indicated above, according to the present invention, an efficient and robust method is provided, which allows to compensate image artifacts, for example, by the heel effect or a beam-hardening. Due to this, a better image quality may be achieved. Also, due to the compensation of the heel effect, the present invention may allow for larger detector arrays, having an increased number of lines.

The invention claimed is:

1. A method of processing polychromatic attenuation values, wherein the polychromatic attenuation values are acquired by means of a polychromatic source of radiation generating a cone beam and radiation detector array with a plurality of detector rows, wherein the plurality of detector rows are arranged adjacent to each other in a first direction perpendicular to a second direction, wherein the second direction is parallel to the plurality of detector rows, the method comprising the step of:
   assigning monochromatic attenuation values to polychromatic attenuation values;
   wherein the polychromatic attenuation values depend on the first direction;
   wherein a look-up table is used for assigning the monochromatic attenuation values to the polychromatic attenuation values.

2. The method of claim 1,
   wherein the look-up table is three-dimensional look-up table; and wherein the assignment of the monochromatic attenuation values to the polychromatic attenuation values which depend on the first direction is such that artifacts caused by a heel effect are at least partially suppressed.

3. The method of claim 1, wherein the look-up table is generated in accordance with the following steps:
determining a spectrum of the source of radiation;
determining mean energies of the spectrum;
determining first projection data by taking into account the polychromatic source of radiation, the detector array and a calibration object;
determining second projection data by taking into account a monochromatic source of radiation, the detector array and the calibration object;
generating a three-dimensional look-up table on the basis of the first and second projection data;
wherein the three-dimensional look-up table comprises monochromatic attenuation values for all corresponding polychromatic attenuation values for each detector row of the plurality of detector rows.

4. The method of claim 1, wherein the plurality of detector rows is seven detector rows.

5. The method of claim 1, wherein the polychromatic attenuation values depend on a cone angle of the cone beam.

6. The method of claim 1, further including outputting an image using the polychromatic attenuation values and the monochromatic attenuation values.

7. A method of generating a look-up table for correcting polychromatic attenuation values acquired by means of a polychromatic source of radiation generating a cone beam and a radiation detector array with a plurality of detector rows, wherein the source of radiation has a spectrum, the method comprising the steps of:
determining mean energies of the spectrum;
determining first projection data by taking into account the polychromatic source of radiation, the detector array and a calibration object;
determining second projection data by taking into account a monochromatic source of radiation, the detector array and the calibration object;
generating a three-dimensional look-up table on the basis of the first and second projection data;
wherein the three-dimensional look-up table comprises monochromatic attenuation values for all corresponding polychromatic attenuation values for each detector row of the plurality of detector rows.

8. The method of claim 7,
wherein the plurality of detector rows is arranged adjacent to each other in a first direction perpendicular to a second direction which is parallel to the plurality of detector rows;
wherein the monochromatic attenuation values depend on the first direction; and
wherein the correction is such that artifacts relating to one of a beam-hardening effect and a heel effect are at least partially suppressed.

9. A data processing device comprising:
a memory for storing polychromatic attenuation values; and
a data processor for processing the polychromatic attenuation values, wherein the data processor is adapted to perform the following operation:
loading the polychromatic attenuation values acquired by means of a polychromatic source of radiation generating a cone beam and radiation detector array with a plurality of detector rows, wherein the plurality of detector rows is arranged adjacent to each other in a first direction perpendicular to a second direction which is parallel to the plurality of detector rows; and
assigning the polychromatic attenuation values to monochromatic attenuation values which depend on the first direction;
wherein a three-dimensional look-up table is used for assigning the monochromatic attenuation values to the polychromatic attenuation values.

10. The data processing device of claim 9,
wherein the data processing device is part of a CT scanner system
wherein the assignment of the monochromatic attenuation values to the polychromatic attenuation values which depend on the first direction is such that artifacts caused by one of a beam-hardening and heel effect are at least partially suppressed.

11. The data processing device of claim 9, wherein the plurality of detector rows is seven detector rows.

12. The data processing device of claim 9, wherein the polychromatic attenuation values depend on a cone angle of the cone beam.

13. The data processing device of claim 9, further including a display for displaying an image output using the polychromatic attenuation values and the monochromatic attenuation values.

14. The data processing device of claim 9, further including a loudspeaker connected to the data processor to output an alarm.

15. A data processing device comprising:
a memory for storing polychromatic attenuation data; and
a data processor for generating a look-up table for correcting polychromatic attenuation values acquired by means of a polychromatic source of radiation generating a cone beam and radiation detector array with a plurality of detector rows, wherein the source of radiation has a spectrum and wherein the data processor is adapted to perform the following operation:
determining mean energies of the spectrum;
determining first projection data by taking into account the polychromatic source of radiation, the detector array and a calibration object;
determining second projection data by taking into account a monochromatic source of radiation, the detector array and the calibration object;
generating a three-dimensional look-up table on the basis of the first and second projection data;
wherein the three-dimensional look-up table comprises monochromatic attenuation values for all corresponding polychromatic attenuation values for each detector row of the plurality of detector rows.

16. The data processing device of claim 15,
wherein the data processing device is part of a CT scanner system; and
wherein the correction is such that artifacts relating to a heel effect are at least partially suppressed.

17. A non-transitory computer-readable medium containing instructions for processing polychromatic attenuation values, wherein the instructions causes a processor to perform the following operation when the instructions are executed on the processor:
loading the polychromatic attenuation values acquired by means of a polychromatic source of radiation generating a cone beam and radiation detector array with a plurality of detector rows, wherein the plurality of detector rows is arranged adjacent to each other in a first direction perpendicular to a second direction which is parallel to the detector rows; and assigning the monochromatic attenuation values to polychromatic attenuation values which depend on the first direction;

wherein a three-dimensional look-up table is used for assigning the monochromatic attenuation values to the polychromatic attenuation values.

18. The computer-readable medium of claim 17, the instructions further causing the processor to output an image using the polychromatic attenuation values and the monochromatic attenuation values.

19. A non-transitory computer-readable medium containing instructions for generating a look-up table for correcting polychromatic attenuation values acquired by means of a polychromatic source of radiation generating a cone beam and radiation detector array with a plurality of detector rows, wherein the source of radiation has a spectrum, wherein the instructions cause a processor to perform the following operation when the instructions are executed on the processor:

determining mean energies of the spectrum;

determining first projection data by taking into account the polychromatic source of radiation, the detector array and a calibration object;

determining second projection data by taking into account a monochromatic source of radiation, the detector array and the calibration object;

generating a three-dimensional look-up table on the basis of the first and second projection data;

wherein the three-dimensional look-up table comprises monochromatic attenuation values for all corresponding polychromatic attenuation values for each detector row of the plurality of detector rows.

20. The computer-readable medium of claim 19, the instructions further causing the processor to output an image using the polychromatic attenuation values and the monochromatic attenuation values.

* * * * *